UNITED STATES PATENT OFFICE 2,511,162

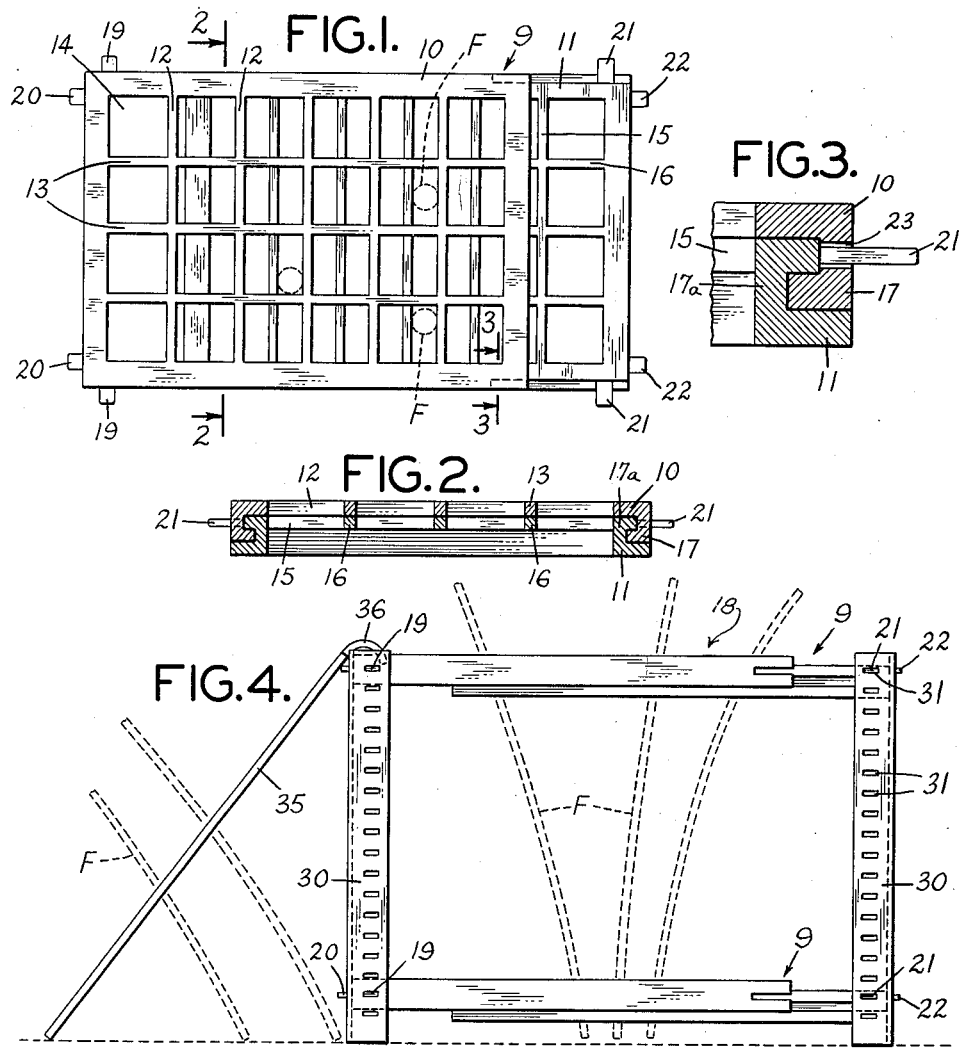

FLOWER HOLDER

Percival E. Jackson, New York, N. Y.

Application February 11, 1948, Serial No. 7,603

8 Claims. (Cl. 47—41)

This invention relates to improvements in article-supports, and it relates particularly to an improved form of device for supporting flowers in different arrangements in bowls, vases and the like.

Many different supporting devices have been suggested heretofore for use in aiding in the arrangement of flowers, including perforated plates or blocks adapted to be inserted in a vase or a bowl for receiving the stems of the flowers and holding the flowers in a reasonably erect position. Other devices consist of weighted bases having pins projecting therefrom upon which the stems of the flowers are impaled. While it would appear that any of these devices would be satisfactory for supporting flowers for making different flower arrangements, as a practical matter, they leave something to be desired for the reason that they do not take into account at all the fact that flower stems vary in length and diameter and that flowers having different sizes of stems may be required in a single flower arrangement and that it may be desired to make many different arrangements. Moreover, these prior devices are of fixed size and they cannot readily be adapted to use in making large or small flower arrangements of different kinds. The lack of flexibility of the prior devices in use is emphasized by the fact that most florists and those skilled in flower arrangement utilized crumpled chicken wire and the like which is shaped according to the needs of the florist to provide a retaining and supporting means for the flowers. However, many people do not have the skill or the material for making such a crumpled wire holder, and, therefore, they have in the past been forced to rely upon the rather unsatisfactory devices which are available on the market.

The present invention has as an object the provision of a flower holder which can be adjusted in size or combined with other similar flower holders for use in making flower arrangements of widely varying pattern and size in receptacles of widely varying size.

Another object of the invention is to provide a flower holder which may be readily adjusted to accommodate or receive flowers having stems of different lengths and diameters.

A further object of the invention is to provide flower holders which may be utilized to grip and thereby firmly retain the stems of flowers so that, when once arranged, they will remain in the desired arrangement.

Still another object of the invention is to provide a simple flower holder by means of which almost any desired flower arrangement may be produced and which may be used with large or small receptacles with equal facility.

The above and other objects will become apparent from the following description of a typical form of flower holder embodying the present invention.

In accordance with the present invention, I have provided flower holders which are made up of a plurality of sections, each including a pair of grid-like elements which are arranged for relative sliding movement so that each section may be extended or contracted in length to vary its overall size and to grip the stems of flowers which are inserted through the openings in the grid members.

More particularly, the pairs of grid elements are slidably connected in face to face relationship so that openings therethrough can be either brought into alignment or moved partially out of alignment to vary the size of the openings to receive and grip flower stems of different diameters. The sections may be connected by means of standards or supports located at each corner of the sections so that two pairs, for example, of the grids, can be arranged in vertical spaced relationship to engage spaced apart portions of the flower stems. The standards or corner pieces may be provided with suitable slots for receiving ears on the sections to permit the spacing between sections to be varied as may be required.

The above-described arrangement, utilizing detachable standards or corner pieces, permits several groups of grid elements to be connected together to build up large flower holders for use in large bowls or receptacles.

For better understanding of the present invention, reference may be had to the accompanying drawing, in which:

Fig. 1 is a plan view of a pair of grid elements embodying the invention with flower stems shown in section therein;

Fig. 2 is a view in section taken on line 2—2 of Fig. 1;

Fig. 3 is a view in section taken on line 3—3 of Fig. 1;

Fig. 4 is a view in side elevation of an assembled flower holder embodying the present invention;

Fig. 5 is a perspective view of one of the standards or corner pieces for connecting the pairs of grids in spaced relation; and Fig. 6 is a plan view of a grid member adapted to be connected to the flower holder for receiving additional flowers.

Referring now to Figs. 1 to 3 of the drawing, one section 9 or one element of a typical flower holder embodying the present invention may consist of two frame or grid members 10 and 11, which, as shown, may be of rectangular shape although it will be understood that they may be square or any other desired polygonal shape. The frame 10 is provided with a plurality of transverse bars 12 and a plurality of longitudinally extending bars 13 which form a grid within the frame providing apertures 14 for receiving of the stems F of flowers. The apertures 14 may be square or any other desired shape and size.

The member 11 is also provided with a similar grid of transversely and longitudinally extending bars 15 and 16. The above-described frame or grid members 10 and 11 may be formed of metal, plastic or any other material which is resistant to water.

Referring now to Figs. 2 and 3, the upper frame or grid member 10 is provided at each longitudinal end with an inturned flange member 17 which cooperates with a complemental flange member 17a on the grid member 11, these flanges 17 and 17a being slidably engageable so that the grid members 10 and 11 can be moved between completely overlapping positions and only partially overlapping positions, as shown in Fig. 1. The relative sliding movement of the grid members 10 and 11 permits the overall length of the assembly to be changed. Thus, for example, when used in a small container, the grid member 11 may be telescoped completely behind the grid member 10 to reduce the section 9 to its smallest overall dimensions. For use in a larger container, the grid members 10 and 11 may be moved relatively to project them to such an extent that the overall length of the section 9 is almost doubled. Relative shifting movement of the two grid members 10 and 11 has the additional function of permitting flower stems F to gripped between the transverse members 12 and 15 of the overlapping portions of the grids 10 and 11 to retain the flower stems in relatively fixed positions.

For the best results and most positive positioning of the flowers in the flower holder, two or more of the sections 9 may be assembled into a complete holding unit 18. In order to permit ready assembly of the sections 9 to form the holder 18, the grid member 10 may be provided with right-angularly related ears or lugs 19 and 20 at each of its left-hand corners and the grid element 11 is provided with similar ears 21 and 22 at each of its right-hand corners, as viewed in Fig. 1. Inasmuch as it may be desired to completely telescope the grid members 10 and 11, the righthand end of each flange 17 on the member 10 may be provided with a slot 23 for receiving the ears 21 when the section 9 is completely telescoped, as best shown in Fig. 3.

The ears 19, 20, 21 and 22 cooperate with corner pieces or standards 30, as shown in Figs. 4 and 5. Each of these corner pieces 30 is of right-angle cross-section and of a suitable length to provide adequate spacing between the upper and lower sections 9. The side flanges of the corner pieces 30 may be provided with a plurality of slots 31 for receiving the lugs or ears on the sections 9 to permit variation in the spacing between the sections. The ears 19 to 22 are preferably of greater length than the thickness of the flanges of the corner pieces 30 so that these ears project outwardly beyond the outer surfaces of the corner pieces. This permits similar corner pieces to be mounted in face to face relation with the corners of a flower holder unit 18, whereby a plurality of such units may be arranged side by side but with the sections 9 in staggered relation to each other. Thus, the flower holder 18 including two sections 9 and the four corner pieces 30, for example, in Fig. 4, may be used by itself either in expanded or contracted position or it may be used in conjunction with one or more similar flower holders as may be required.

It may be desired also to arrange flowers around the flower holder in Fig. 4, and, to this end, I have provided additional grid members 35 which have hook members 36 at one end to engage over the ends or sides of the frames 10 and 11 to hold the members 35 in inclined relation to the holder 18, as best shown in Fig. 4. The grid members 35 may be made of metal or plastic or other material, as desired.

Flower holders of the type described above may be supplied in kits containing two sections 9 and four corner pieces 30 and one or more of the inclined grids 35. Larger kits consisting of multiples of the single flower holder 18 may be supplied for more complicated and larger flower arrangements. In either case, the device is readily adjustable to accommodate flowers having stems of different lengths and diameters by varying the spacing between the upper and lower sections of the holder and it permits several uits to be assembled for use is large or small containers.

From the preceding description of a typical form of flower holder embodying the present invention, it will be apparent that I have provided a holder or support whereby many different flower arrangements can be produced, and in which positive control of the position of the flowers in the arrangement is assured.

It will be understood that the device is susceptible to considerable modification and that the type of standards and the shape and dimensions of the grid elements may be varied widely without departing from the invention. Therefore, the form of the invention described above should be considered as illustrative and not as limiting the scope of the following claims.

I claim:

1. A flower holder comprising a pair of four-sided frame members, each frame member having a plurality of openings therein, means connecting said frame members for relative sliding movement, lugs projecting outwardly at one end of one frame member and at the opposite end of the other frame member, and standards detachably connected with said lugs to support said frame members, said standards being movable with the frame members to which they are connected.

2. The flower holder set forth in claim 1 in which the standards are substantially right angular in cross-section to engage the corners of said frame members and are provided with a plurality of slots along their length for receiving said lugs.

3. A flower holder comprising a first grid member of generally rectangular shape having openings therethrough, a second grid member of generally rectangular shape having openings therethrough, means at opposite edges of said grid members connecting them for relative sliding movement between partially overlapped and substantially overlapped positions, and projecting lugs at one end of one of said grid members for supporting said grid members and similar lugs at the opposite end of the other grid member.

4. A flower holder comprising a first grid member of generally rectangular shape having openings therethrough, a second grid member of generally rectangular shape having openings therethrough, means at opposite edges of said grid members connecting them for relative sliding movement between partially overlapped and substantially completely overlapped positions, projecting lugs at the corners at one end of said grid members, projecting lugs at the corners at the opposite end of the other grid member, a second similar pair of relatively slidable grid members, and standards detachably connected to the lugs of each pair of grid elements for supporting the slidably connected pairs in spaced apart relation.

5. A flower holder comprising a first pair of superimposed generally rectangular grid members having openings therethrough for receiving flower stems, said grid members being slidable relatively to project one member at least partially beyond the other member, a second similar pair of grid members, and standards adjacent to the corners of the pairs of grid members for supporting one pair in spaced apart, substantially parallel relation to the other pair.

6. A flower holder comprising an upper and a lower unit for receiving stems of flowers and, means detachably engaging said units to support them in spaced apart substantially parallel relation, each of said units comprising a pair of grid members in face to face relation, and means on said grid members connecting them for relative sliding movement in parallel planes.

7. A flower holder comprising a pair of frame members, each frame member having a plurality of openings therein, means connecting said frame members for relative sliding movement to shift the openings in one into and out of alignment with the openings in the other, a second similar pair of frame members, first spacer means connecting one edge portion of one frame member of one pair with a corresponding edge portion of one frame member of the other pair and a second spacer means spaced from the first spacer means connecting edge portions of the other frame members of said pairs to support said pairs in spaced apart relation.

8. A flower holder comprising a pair of frame members of substantially the same size, each frame member having a plurality of openings through its mid-portion for receiving flower stems, interfitting grooves and flanges at opposite lateral edges of said frames slidably connecting said frames in face to face relation to permit movement of said frames to move the openings therein into and out of alignment.

PERCIVAL E. JACKSON.

REFERENCES CITED

The following references are of record in the file of this patent:

UNITED STATES PATENTS

| Number | Name | Date |
|---|---|---|
| 419,370 | Swart | Jan. 14, 1890 |
| 1,047,366 | Alston | Dec. 17, 1912 |
| 1,473,064 | Vance | Nov. 6, 1923 |
| 2,223,996 | Leeper | Dec. 3, 1940 |
| 2,261,326 | Atkisson et al. | Nov. 4, 1941 |
| 2,428,116 | Jensen | Sept. 30, 1947 |